United States Patent
Kuo (10) Patent No.: US 9,557,370 B2
(45) Date of Patent: Jan. 31, 2017

(54) METHODS OF IMPROVING BUMP ALLOCATION FOR SEMICONDUCTOR DEVICES AND SEMICONDUCTOR DEVICES WITH IMPROVED BUMP ALLOCATION

(75) Inventor: Yung-Hsin Kuo, Zhubie (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 1250 days.

(21) Appl. No.: 13/371,120

(22) Filed: Feb. 10, 2012

(65) Prior Publication Data

US 2013/0207107 A1 Aug. 15, 2013

(51) Int. Cl.
| | |
|---|---|
| H01L 21/66 | (2006.01) |
| G01R 31/28 | (2006.01) |
| H01L 23/50 | (2006.01) |
| G06F 17/50 | (2006.01) |
| H01L 23/00 | (2006.01) |
| H01L 25/00 | (2006.01) |

(52) U.S. Cl.
CPC ........... *G01R 31/2884* (2013.01); *H01L 23/50* (2013.01); *G06F 17/5077* (2013.01); *G06F 17/5081* (2013.01); *G06F 2217/40* (2013.01); *H01L 24/11* (2013.01); *H01L 24/14* (2013.01); *H01L 24/17* (2013.01); *H01L 25/50* (2013.01); *H01L 2224/0401* (2013.01); *H01L 2224/05008* (2013.01); *H01L 2224/05022* (2013.01); *H01L 2224/05569* (2013.01); *H01L 2224/05572* (2013.01); *H01L 2224/13111* (2013.01); *H01L 2224/14131* (2013.01); *H01L 2924/00014* (2013.01)

(58) Field of Classification Search
CPC .......... H01L 23/50; H01L 24/11; H01L 24/14; H01L 24/17; H01L 2224/14131; H01L 2224/14515; H01L 2224/0401; G06F 17/5077; G06F 17/5081; G06F 2217/40
USPC .............................................. 438/4
See application file for complete search history.

(56) References Cited

U.S. PATENT DOCUMENTS

| | | | | |
|---|---|---|---|---|
| 4,954,453 | A * | 9/1990 | Venutolo | B23K 1/018 228/119 |
| 5,885,855 | A * | 3/1999 | Liang | H01L 23/50 257/E23.02 |
| 6,119,325 | A * | 9/2000 | Black | H01L 24/81 257/E21.511 |
| 6,211,576 | B1 * | 4/2001 | Shimizu | H01L 23/50 257/673 |
| 6,867,489 | B1 * | 3/2005 | Estacio | H01L 24/02 257/692 |
| 7,119,446 | B2 * | 10/2006 | Shimizu | H01L 23/50 257/522 |
| 7,353,476 | B2 * | 4/2008 | Imada | G06F 17/5068 257/E23.079 |
| 7,675,148 | B2 * | 3/2010 | Lim | H01L 23/4334 257/676 |

(Continued)

FOREIGN PATENT DOCUMENTS

JP 2001-284488 * 10/2001 ............ H01L 23/12

*Primary Examiner* — Mary Wilczewski
(74) *Attorney, Agent, or Firm* — Hauptman Ham, LLP (57) ABSTRACT

In a method of improving bump allocation for a semiconductor device and a semiconductor device with improved bump allocation, a predetermined signal bump is surrounded with at least three bumps, each being a ground bump or a paired differential signal bump.

20 Claims, 7 Drawing Sheets

(56) References Cited

U.S. PATENT DOCUMENTS

| | | | |
|---|---|---|---|
| 7,786,476 B2* | 8/2010 | Siebert | H01L 21/485 257/48 |
| 9,070,677 B2* | 6/2015 | Park | H01L 23/49811 |
| 9,219,047 B2* | 12/2015 | Motoyoshi | H01L 24/11 |
| 9,372,951 B2* | 6/2016 | Wang | G06F 17/5077 |
| 2002/0190390 A1* | 12/2002 | Lu | H01L 24/02 257/776 |
| 2004/0026794 A1* | 2/2004 | Tao et al. | 257/778 |
| 2005/0132306 A1* | 6/2005 | Smith | G06F 17/5068 716/114 |
| 2006/0192282 A1* | 8/2006 | Suwa | H01L 23/50 257/723 |
| 2006/0226928 A1* | 10/2006 | Henning | H05K 1/0222 333/33 |
| 2007/0040735 A1* | 2/2007 | Matsuo | H01L 23/552 342/175 |
| 2007/0230147 A1* | 10/2007 | Abe | 361/767 |
| 2007/0234261 A1* | 10/2007 | Nakagawa | G06F 17/5077 716/127 |
| 2007/0245276 A1* | 10/2007 | Imada | G06F 17/5068 716/112 |
| 2007/0249068 A1* | 10/2007 | Siebert | H01L 21/485 438/4 |
| 2008/0224285 A1* | 9/2008 | Lim | H01L 23/4334 257/675 |
| 2010/0264950 A1* | 10/2010 | Kaku | G01R 31/024 324/750.3 |
| 2011/0074047 A1* | 3/2011 | Pendse | H01L 24/03 257/782 |
| 2011/0283034 A1* | 11/2011 | Kang | H01L 24/11 710/305 |
| 2012/0104596 A1* | 5/2012 | Shah | H01L 23/50 257/737 |
| 2013/0207107 A1* | 8/2013 | Kuo | H01L 23/50 257/48 |
| 2015/0143324 A1* | 5/2015 | Wang | G06F 17/5077 716/135 |
| 2015/0228602 A1* | 8/2015 | Sato | H01L 24/14 257/774 |
| 2016/0154924 A1* | 6/2016 | Ozawa | G06F 17/5081 716/115 |
| 2016/0238632 A1* | 8/2016 | Hong | G01R 31/2601 |

* cited by examiner

METHODS OF IMPROVING BUMP ALLOCATION FOR SEMICONDUCTOR DEVICES AND SEMICONDUCTOR DEVICES WITH IMPROVED BUMP ALLOCATION

BACKGROUND

Generally, semiconductor wafers are tested (or probed) before being singulated into individual chips or dies. The reason is to check for faults and to identify defective dies which will be marked to be excluded from a subsequent packaging process after singulation. Thus, packaging costs can be saved.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

It is to be understood that the following disclosure provides many different embodiments or examples, for implementing different features of various embodiments. Specific examples of components and arrangements are described below to simplify the present disclosure. The inventive concept may, however, be embodied in many different forms and should not be construed as being limited to the embodiments set forth herein; rather, these embodiments are provided so that this description will be thorough and complete, and will fully convey the inventive concept to those of ordinary skill in the art. It will be apparent, however, that one or more embodiments may be practiced without these specific details.

In the drawings, the thickness and width of layers and regions are exaggerated for clarity. Like reference numerals in the drawings denote like elements. The elements and regions illustrated in the figures are schematic in nature, and thus relative sizes or intervals illustrated in the figures are not intended to limit the scope of the inventive concept.

Figure 1A:
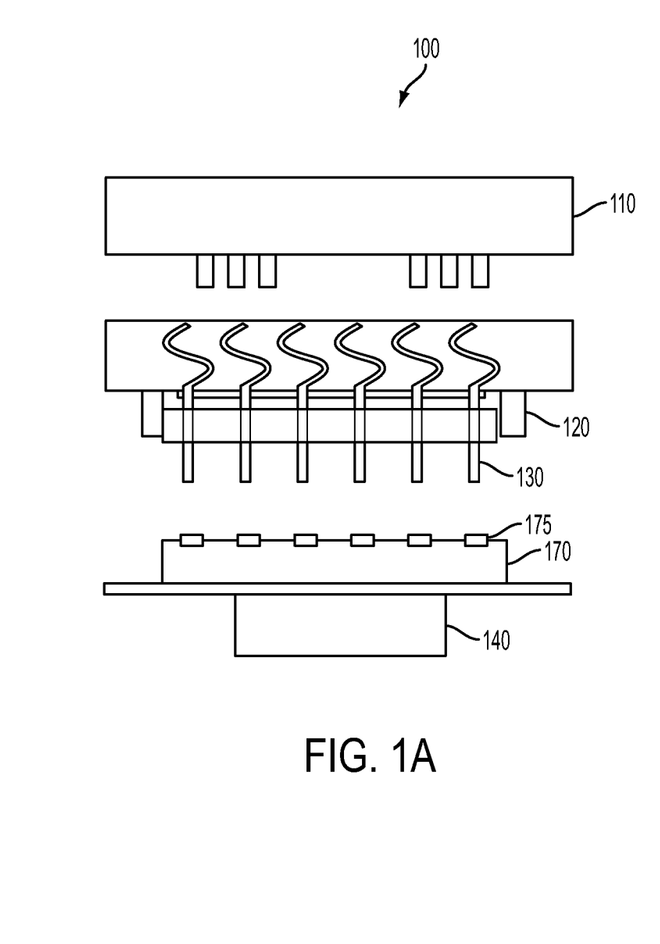
FIG. 1A is a schematic diagram of a system for probing semiconductor wafers.

FIG. 1A is a schematic diagram of a system 100 for probing a semiconductor wafer.

The wafer probing system 100 includes a test head 110, a probe card 120 having a plurality of probe pins 130, and a chuck 140. The test head 110 is arranged to generate or route test signals for the probe pins 130 via the probe card 120. The probe pins 130 are arranged in an array and are of any configuration suitable for probing semiconductor wafers or dies. The chuck 140 is arranged for supporting thereon a wafer 170, and moves the supported wafer 170 toward and away from the probe pins 130 for causing intended electrical contact between the probe pins 130 and the conductors 175 of the supported wafer 170.

The conductors 175 include, but are not limited to, conductive traces (patterns), bonding pads, test pads, etc. Conductive traces are for routing electrical signals, power or ground voltages among components and/or integrated circuits included in/on the wafer 170. Bonding pads are for electrical and/or mechanical connections to external devices. Test pads are arranged specifically for testing purposes. Any conductor on the surface of the wafer 170 can be considered as a conductive pad to be brought into contact with one of the probe pins 130 for receiving test signals to probe the wafer 170. However, not all conductors 175 on the surface of the wafer 170 are necessarily used for probing the wafer 170 in every test.

During a semiconductor wafer testing or probing process, the wafer 170 is supported on the chuck 140. The chuck 140 moves toward the probe pins 130 to cause reliable mechanical and electrical contact between the probe pins 130 and the conductive pads to be tested. Test signals are transmitted from the test head 110, to the probe pins 130 and then to the conductive pads to be tested for probing the wafer 170. In some embodiments, automated test equipment (ATE) is used to generate test signals to be sent to the system 100 via the test head 110.

In some embodiments, the test signals are high frequency test signals, for example, in the range from several megahertz (MHz) to 6 gigahertz (GHz), or even higher, e.g., up to 30 GHz. The high frequency test signals, also referred to herein as radio frequency (RF) test signals, are used to test certain RF response characteristics of one or more components and/or integrated circuits included in/on the wafer 170 which are configured to operate in RF environments. As the components and/or integrated circuits become smaller with increasing functionalities, the pitch between conductors 175 of the wafer 170, and hence between the probe pins 130, becomes smaller as well. Coupled with the high speed, high frequency of the test signals, signal interference between adjacent probe pins 130, under certain circumstances, becomes undesirably high.

Figure 1B:
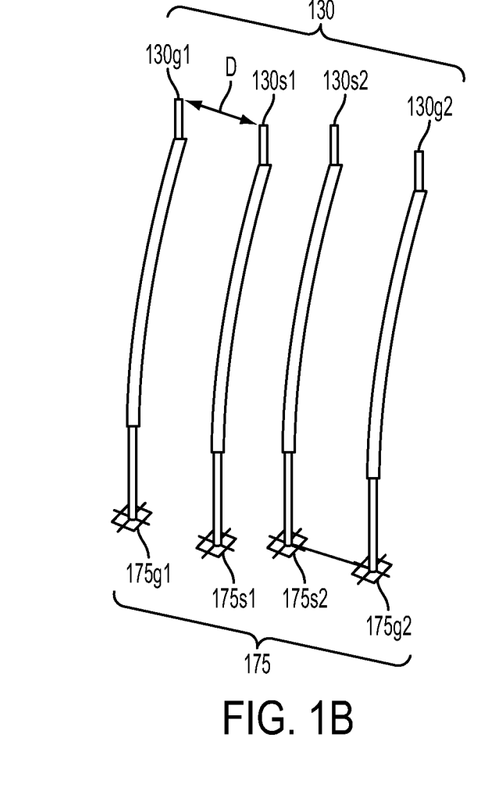
FIG. 1B is a schematic perspective view of some probe pins in a system for probing semiconductor wafers.

FIG. 1B is a schematic perspective view of four probe pins 130, namely 130s1, 130s2, 130g1, 130g2, in contact with a corresponding set of four conductors 175, namely, 175s1, 175s2, 175g1, 175g2. Specifically, high frequency test signals sent through signal pins 130s1 and 130s2 to/from the respective signal conductors 175s1, 175s2 are likely to interfere with one another or with the test signals transmitted through other, nearby probe pins 130.

Ground pins, such as 130g1, 130g2, which are in contact with the respective ground conductors 175g1, 175g2, provide a shielding effect that reduces interference between adjacent signal pins. Such a shielding effect is similar to that of a twin-wire transmission line. For example, the signal pin 130s1 and the ground pin 130g1 are disposed in parallel and close to each other, and behave similarly to a twin-wire transmission line. The shielding effect becomes stronger as the center-to-center distance D between the wires, i.e., signal pin 130s1 and the ground pin 130g1, decreases. The shielding effect is also enhanced when more than one ground pin is arranged around a signal pin. In this case, the group of such a signal pin and the surrounding ground pins behaves similarly to a coaxial transmission line. By arranging multiple ground conductors, such as 175g1, around a signal conductor, such as 175s1, a shielding effect similar to that of a coaxial transmission line is achievable during probing of the wafer.

In some embodiments, a bump pattern to be formed for a semiconductor device is modified to arrange at least three bumps around each signal bump to be shielded from interference during probing of the semiconductor device. Each of the at least three bumps is a ground bump or a paired differential signal bump. The modification includes adding one or more new bumps to the bump pattern and/or moving one or more pre-existing bumps of the bump pattern.

As used herein, a "semiconductor device" is a chip, a chip stack, a chip package or an interposer. An example of a semiconductor device is a bare chip or die. Another example of a semiconductor device is a chip package which includes, in addition to at least one chip, a carrier or substrate on which the at least one chip is mounted. Yet another example of a semiconductor device is a stack of chips one on top another, e.g., in a three-dimensional integrated circuits (3D ICs). The chips that make up the 3D IC are also referred to as interposers which serve as further examples of a semiconductor device. An interposer includes one or more active components and/or passive components. If an interposer includes no active component, it is a passive interposer. Conductive vias, e.g., through-silicon vias (TSVs), are formed to define interconnect structures that interconnect the chips in the 3D IC together. The interconnect structures are also connected via TSVs to conductors, e.g., pads, on an outer surface of the 3D IC. The pads are used to connect the 3D IC to external devices and/or for testing the 3D IC before singulation and packaging. It is also possible to test (probe) interposers before stacking and bonding the interposers to obtain a 3D IC.

As used herein, a "bump" is a conductor on a surface of a semiconductor device for defining an electrical connection for the semiconductor device, either during operation or probing of the semiconductor device. Examples of a bump include those described above with respect to conductors 175. Further examples include Controlled Collapse Chip Connection (C4) bumps.

As used herein, a "ground bump" is a bump configured to receive a ground voltage during operation or probing of the semiconductor device. The ground voltage is often, but not necessarily, zero. During probing of the semiconductor device, the ground voltage is applied to a ground bump through the probe pin in contact with the ground bump and/or via a ground plane of the semiconductor device to which the ground bump is connected. In the latter case, the ground voltage is applied to the ground plane of the semiconductor device from the testing equipment via another probe pin in contact with another ground bump of the semiconductor device.

As used herein, a "signal bump" is a bump configured to receive a variable voltage, other than the ground voltage and any power supply voltage, during operation or probing of the semiconductor device.

As used herein, "a pair of differential signal bumps" includes two signal bumps configured to receive differential signals during operation or probing of the semiconductor device. For one of the signal bumps in the pair, the other signal bump is a "paired differential signal bump." Differential signals include two signals one of which is the inverted version of the other. When differential signals are in the RF spectrum, e.g., from a few MHz to 30 GHz, the differential signals are referred to as RF differential signals.

Figure 2:
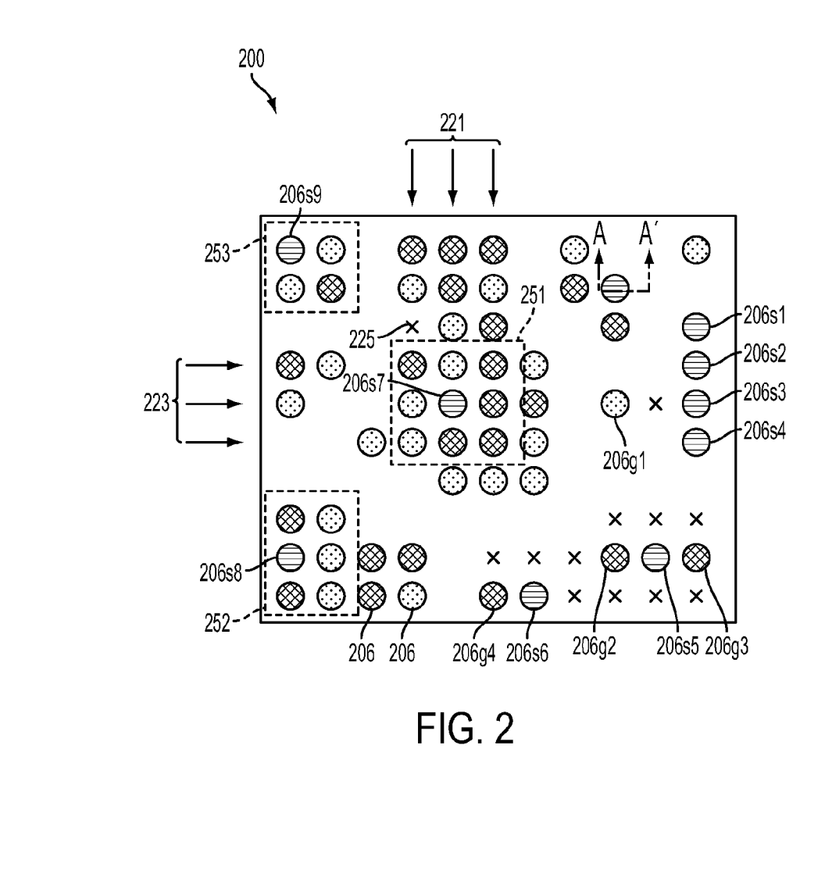
FIG. 2 is a schematic plan view of a bump pattern.

FIG. 2 is a schematic plan view of a bump pattern 200 of a semiconductor device. The bump pattern 200 includes a plurality of bumps 206 defining electrical connections for the semiconductor device during operation or probing of the semiconductor device. The bump pattern 200 includes a plurality of columns 221 (identified by vertical arrows in FIG. 2) and rows 223 (identified by horizontal arrows in FIG. 2) which cross or intersect each other at a plurality of intersections 225. For the sake of simplicity, only one intersection 225 is indicated in FIG. 2. Other intersections are denoted, where appropriate for the discussion herein, with symbols "x." In some embodiments, the columns and rows are perpendicular to each other. In some embodiments, the columns and rows are not perpendicular, e.g., they intersect at an angle greater than 90 degrees or less than 90 degrees.

The bumps 206 are each arranged at one of the intersections 225. The physical arrangement of the bumps 206 in the bump pattern 200 is configured, e.g., by a chip designer or vendor, with a primary consideration given to the semiconductor device's operation. As such, the bumps 206 are often distributed not in any particular order, as illustrated in FIG. 1. In such a distribution of the bumps 206, signal bumps are also often distributed not in any particular order.

For example, signal bumps 206s1-206s4 are arranged side-by-side and are prone to interference during probing of the semiconductor device. A ground bump 206g1 is nearby and provides no shielding effect against such interference, because the ground bump 206g1 is not positioned between any two of the signal bumps 206s1-206s4. Another example includes a signal bump 206s6 which is placed next to a ground bump 206g4. Although the ground bump 206g4 provides some shielding effect against interference, such shielding effect is similar to that of a twin-wire transmission line and is often insufficient. A better shielding effect is provided by ground bumps 206g2-206g3, which are positioned adjacent a signal bump 206s5, in a manner more closely resembling a coaxial transmission line. Such a shielding effect is nevertheless insufficient under certain circumstances.

In some embodiments, at least three ground bumps are arranged around and immediately adjacent a signal bump to provide a shielding effect for the signal bump.

As used herein, two bumps are considered immediately adjacent if there is no other bump between the two bumps. In the bump pattern 200 having columns 221 and rows 223 as illustrated in FIG. 2, immediately adjacent bumps are referred to as "neighboring bumps." A neighboring bump of a specific bump is either (i) a bump immediately adjacent the specific bump in the same column or row as the specific bump or (ii) a bump in the immediately adjacent column and the immediately adjacent row to the specific bump.

For example, given a corner bump 206s9 at a corner of the bump pattern 200, up to three neighboring bumps are positionable around the bump 206s9 in a neighboring bump region 253 of the bump 206s9. The bumps outside the region 253 are not neighboring bumps. In some embodiments, if the bump 206s9 is a signal bump for which an interference shield is to be provided, all three neighboring bumps provided in the region 253 are configured to be ground bumps.

For an edge bump 206s8 along an edge of the bump pattern 200, up to five neighboring bumps are positionable around the bump 206s8 in a neighboring bump region 252 of the bump 206s8. The bumps outside the region 252 are not neighboring bumps. In some embodiments, when the bump 206s8 is a signal bump for which an interference shield is to be provided, at least three neighboring bumps are provided in the region 252 and are configured to be ground bumps. Although the region 252 in the specific embodiment illustrated in FIG. 2 is completely filled with bumps, one or two intersections in the region 252 where neighboring bumps are positionable are left empty in some embodiments. In some embodiments, any preexisting bump(s), which is/are not a ground bump, in the region 252 is rearranged outside the region 252 to avoid interference with the signal bumps 206s8.

For a bump 206s7 (which is neither a corner bump nor an edge bump) in a middle part of the bump pattern 200, eight neighboring bumps define a neighboring bump region 251 for the bump 206s7. The bumps outside the region 251 are not neighboring bumps. In some embodiments, if the bump 206s7 is a signal bump for which an interference shield is to be provided, at least three neighboring bumps are provided in the region 251 and are configured to be ground bumps. Although the region 251 in the specific embodiment illustrated in FIG. 2 is completely filled with bumps, up to five intersections in the region 251 where neighboring bumps are positionable are left empty in some embodiments. In some embodiments, any preexisting bump(s), which is/are not a ground bump, in the region 251 is rearranged outside the region 251 to avoid interference with the signal bumps 206s7.

Figure 3:
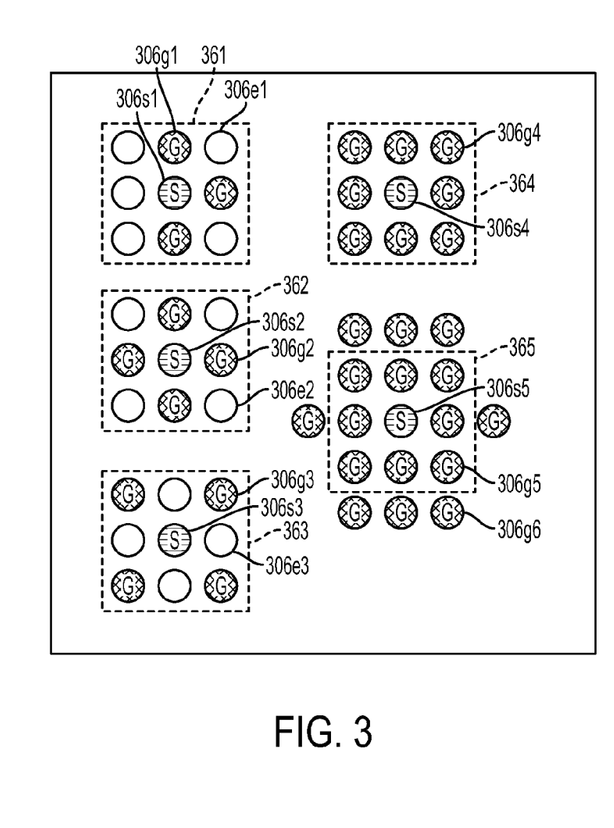
FIG. 3 is a schematic plan view of several regions of bump patterns in accordance with some embodiments.

Some arrangements of ground bumps (denoted with letter "G") around signal bumps (denoted with letter "S") for shielding interference in accordance with some embodiments are given in FIG. 3.

Specifically, in a region 361, a signal bump 306s1 is surrounded with three ground bumps 306g1. The three ground bumps 306g1 are equidistant from the signal bump 306s1. The other intersections 306e1 in the region 361 where one or more further neighboring bumps are positionable are left empty.

In a region 362, a signal bump 306s2 is surrounded with four ground bumps 306g2. The four ground bumps 306g2 are equidistant from the signal bump 306s2. The other intersections 306e2 in the region 362 where one or more further neighboring bumps are positionable are left empty.

In a region 363, a signal bump 306s3 is surrounded with four ground bumps 306g3 at the intersections corresponding to the empty intersections 306e2 in the region 362. The four ground bumps 306g3 are equidistant from the signal bump 306s3. In the region 363, the other intersections 306e3 (which correspond to the intersections where the four ground bumps 306g2 are provided in the region 362) where one or more further neighboring bumps are positionable are left empty. At the same pitch between adjacent bumps, the ground bumps 306g2 are closer to the signal bump 306s2 than the ground bumps 306g3 to the signal bump 306s3, and provide a greater shielding effect.

A better shielding effect is achieved in a region 364 in comparison with the foregoing configurations, where a signal bump 306s4 is surrounded with eight ground bumps 306g4. There are no empty intersections in the region 364 where one or more further neighboring bumps are positionable.

Similar to region 364, in a region 365, a signal bump 306s5 is surrounded with eight ground bumps 306g5. There are no empty intersections in the region 365 where one or more further neighboring bumps are positionable. There are further ground bumps 306g6 outside and around the region 365 to further enhance the shielding effect for the signal bump 306s5.

In some embodiments, the center-to-center distance or pitch between the signal bump, e.g., any one of signal bumps 306s1-306s5 and the respective neighboring, ground bumps, e.g., 306g1-306g5, is 180 µm or less. In some embodiments, one or more ground bumps and/or one or more signal bumps in the bump pattern are not necessarily located at intersections of columns and rows of a grid. However, a shielding effect similar to that of a coaxial transmission line is still achievable by arranging at least three ground bumps (not necessarily at intersections of a grid) around a signal bump. The shielding effect is enhanced when the center-to-center distance or pitch between the signal bump and each of the at least three ground bumps is 180 µm or less.

Figure 4:
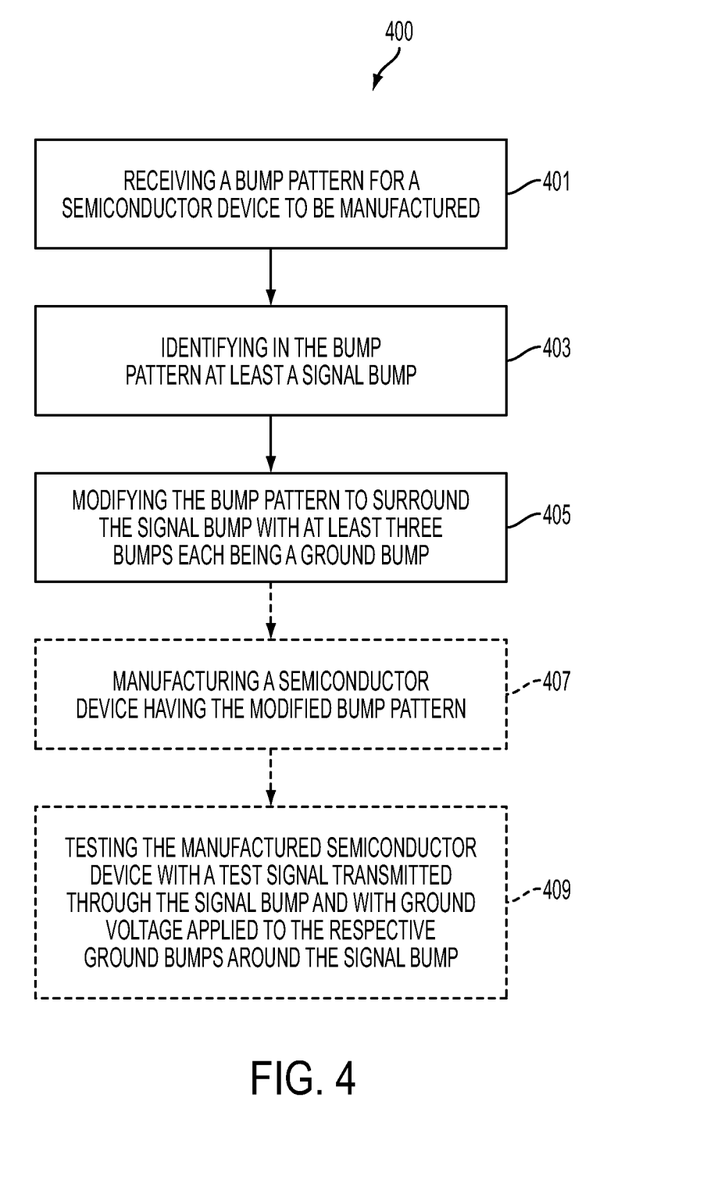
FIG. 4 is a flow chart of a method in accordance with some embodiments.

The arrangement of ground bumps around a signal bump as described above requires, in some embodiments, modifying a bump pattern initially provided for the semiconductor device. FIG. 4 is a flow chart of a method 400 in accordance with such embodiments.

At operation 401, a bump pattern of a plurality of bumps to be formed as electrical connections for a semiconductor device is received. For example, a bump pattern 200 described with respect to FIG. 2 is received.

At operation 403, at least one signal bump is identified in the received bump pattern. For example, signal bumps 206s1-206s9 described with respect to FIG. 2 are identified. In some embodiments, not all signal bumps are identified. In some embodiments, RF signal bumps are identified.

At operation 405, an arrangement of bumps in a neighboring bump region of the at least one identified signal bump is modified to ensure that at least three ground bumps are arranged around and immediately adjacent the signal bump. For example, for a signal bump which is a corner bump 206s9 (FIG. 2), the arrangement of bumps in the neighboring bump region 253 of the signal bump 206s9 is modified to include all three neighboring bumps being ground bumps, as described with respect to FIG. 2. For a signal bump which is an edge bump 206s8 (FIG. 2) or a bump 206s7 (FIG. 2) that is neither an edge bump nor a corner bump, the arrangement of bumps in the respective neighboring bump region 252 or 251 of the signal bump 206s8 or 206s7 is modified to include all three neighboring bumps being ground bumps, as described with respect to FIG. 2. In some embodiments, the resulting modified bump arrangement includes, but is not limited to, any of the arrangements described with respect to FIG. 3.

In some embodiments, the modification includes adding one or more new ground bumps to be a neighboring bump of the signal bump to be shielded from interference. For example, for a signal bump 206s6 (FIG. 2) which, in the initial bump pattern, has only one neighboring, ground bump 206g4, at least two new ground bumps are added to empty intersections (marked with symbol "x" in FIG. 2) around the signal bump 206s6 to provide the interference shielding effect.

In some embodiments, the modification includes moving one or more preexisting ground bumps to be a neighboring bump of the signal bump to be shielded from interference. For example, for a signal bump 206s5 (FIG. 2) which, in the initial bump pattern, has only two neighboring, ground bumps 206g2 and 206g3, a preexisting ground bump, e.g., 206g1, which in the initial bump pattern provides almost no shielding effect for any signal bump, is moved to an empty intersection (marked with symbol "x" in FIG. 2) around the signal bump 206s5 to provide the interference shielding effect.

At operation 407, the semiconductor device is manufactured with the modified bump pattern. Any manufacturing process suitable for fabrication of semiconductor devices is applicable. An exemplary process will be described later with respect to FIG. 7.

At operation 409, the manufactured semiconductor device is probed, for example, with a wafer probing system 100 as described with respect to FIG. 1. Specifically, the probe pins 130 (FIG. 1) of the wafer probing system 100 are brought in contact with respective bumps of the semiconductor device. Test signals are transmitted through the probe pin in contact with the signal bump, e.g., 306s1-306s5 in FIG. 3, whereas the ground voltage is applied to the at least three probe pins in contact with the neighboring, ground bumps, e.g., 306g1-306g5 in FIG. 3, around the signal bump. As a result, the test signals transmitted through the probe pin in contact with the signal bump are shielded from interference by the at least three probe pins in contact with the neighboring, ground bumps to achieve a shielding effect similar to that of a coaxial transmission line, especially where the test signals are RF signals. In addition, impedance control is achievable by an appropriate arrangement (e.g., number and/or position) of ground bumps around the signal bump to approximately approach a desired impedance characteristic. Thus, high speed and/or high frequency probing is possible with inexpensive and common probe pins (e.g., straight needles) and/or probe cards, without requiring specialized probe pins and/or probe cards which are more complex and expensive.

In some embodiments, operation 407 or both operations 407 and 409 is/are omitted.

In some embodiments, the processes described with respect to operations 401, 403, 405 are realized by a processor, e.g., a central processing unit (CPU) of a computer system, which is programmed for performing such processes. However, in further embodiments, one or more of the processes is/are performed by specifically configured hardware (e.g., by one or more application specific integrated circuits or ASIC(s)) which is/are provided) separate from or in lieu of the processor. Some embodiments incorporate more than one of the described processes in a single ASIC. In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, signal bumps to be shielded from interference include one or more pairs of differential signal bumps for transmission of differential signals. To provide a shielding effect for a pair of differential signal bumps, three ground bumps are provided around the pair of differential signal bumps. In addition, at least two among the at least three ground bumps are arranged around each differential signal bump in the pair of differential signal bumps.

Figure 5A:
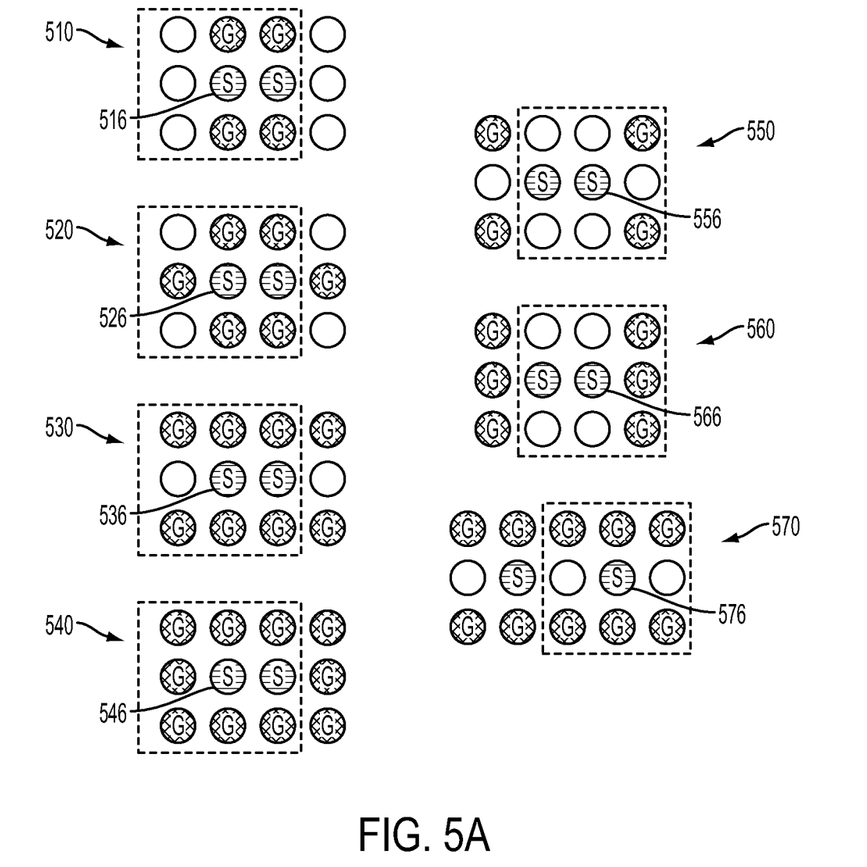
FIGS. 5A and 5B are schematic plan views of several regions of bump patterns in accordance with some embodiments.

Some arrangements 510-570 of ground bumps around differential signal bumps for shielding interference in accordance with some embodiments are given in FIG. 5A. The neighboring bump region of one of the differential signal bumps is illustrated by dot-dot line for each arrangement 510-570 for the sake of simplicity and clarity.

As shown by the neighboring bump regions, in each of the arrangements 510-560, each of differential signal bumps (denoted with letter "S") is surrounded by at least three neighboring bumps one of which is the other differential signal bump and the remaining neighboring bumps are ground bumps (denoted with letter "G"). A shielding effect similar to that of a coaxial transmission line is therefore achievable in a manner similar to that described above with respect to FIGS. 2-4.

Specifically, in the arrangement 510, at least three (namely, four) ground bumps are provided around a pair of differential signal bumps. In addition, each differential signal bump is further immediately adjacent at least two (namely, all four) of the ground bumps. Particularly, the ground bumps immediately adjacent one of the differential signal bumps, i.e., 516, are indicated to be located within the dot-dot frame. The ground bumps provide the pair of differential signal bumps with a shielding effect similar to that of a coaxial transmission line, in a manner similar to that described above with respect to FIGS. 2-4.

In the arrangement 520, at least three (namely, six) ground bumps are provided around a pair of differential signal bumps. In addition, each differential signal bump is further immediately adjacent at least two (namely, five) of the ground bumps. Particularly, the ground bumps immediately adjacent one of the differential signal bumps, i.e., 526, are indicated to be located within the dot-dot frame. The ground bumps provide the pair of differential signal bumps with a shielding effect similar to that of a coaxial transmission line, in a manner similar to that described above with respect to FIGS. 2-4.

In the arrangement 530, at least three (namely, eight) ground bumps are provided around a pair of differential signal bumps. In addition, each differential signal bump is further immediately adjacent at least two (namely, six) of the ground bumps. Particularly, the ground bumps immediately adjacent one of the differential signal bumps, i.e., 536, are indicated to be located within the dot-dot frame. The ground bumps provide the pair of differential signal bumps with a shielding effect similar to that of a coaxial transmission line, in a manner similar to that described above with respect to FIGS. 2-4.

In the arrangement 540, at least three (namely, ten) ground bumps are provided around a pair of differential signal bumps. In addition, each differential signal bump is further immediately adjacent at least two (namely, seven) of the ground bumps. Particularly, the ground bumps immediately adjacent one of the differential signal bumps, i.e., 546, are indicated to be located within the dot-dot frame. The ground bumps provide the pair of differential signal bumps with a shielding effect similar to that of a coaxial transmission line, in a manner similar to that described above with respect to FIGS. 2-4.

In the arrangement 550, at least three (namely, four) ground bumps are provided around a pair of differential signal bumps. In addition, each differential signal bump is further immediately adjacent at least two (namely, two) of the ground bumps. Particularly, the ground bumps immediately adjacent one of the differential signal bumps, i.e., 556, are indicated to be located within the dot-dot frame. The ground bumps provide the pair of differential signal bumps with a shielding effect similar to that of a coaxial transmission line, in a manner similar to that described above with respect to FIGS. 2-4.

In the arrangement 560, at least three (namely, six) ground bumps are provided around a pair of differential signal bumps. In addition, each differential signal bump is further immediately adjacent at least two (namely, three) of the ground bumps. Particularly, the ground bumps immediately adjacent one of the differential signal bumps, i.e., 566, are indicated to be located within the dot-dot frame. The ground bumps provide the pair of differential signal bumps with a shielding effect similar to that of a coaxial transmission line, in a manner similar to that described above with respect to FIGS. 2-4.

The differential signal bumps are not necessarily positioned as neighboring bumps. In the arrangement 570, the differential signal bumps are spaced from each other by an empty intersection. In this case, at least three (namely, ten) ground bumps are provided around the pair of differential signal bumps. In addition, each differential signal bump is further immediately adjacent at least two (namely, six) of the ground bumps. Particularly, the ground bumps immediately adjacent one of the differential signal bumps, i.e., 576, are indicated to be located within the dot-dot frame. The ground bumps provide the pair of differential signal bumps with a shielding effect similar to that of a coaxial transmission line, in a manner similar to that described above with respect to FIGS. 2-4.

In some embodiments, one or more ground bumps and/or one or more differential signal bumps in the bump pattern are not necessarily located at intersections of columns and rows of a grid. However, a shielding effect similar to that of a coaxial transmission line is still achievable by arranging at least three ground bumps (not necessarily at intersections of a grid) around a pair of differential signal bumps so that each differential signal bump is immediately adjacent at least two of the ground bumps. In this aspect, some arrangements 580, 580A, 590, 590A, 598, 599 of ground bumps around differential signal bumps for shielding interference in accordance with some embodiments are given in FIG. 5B.

For example, in an arrangement 580, four ground bumps 581-584 are arranged around a pair of differential signal bumps 586, 587. Two of the ground bumps, namely 583, 584, and the differential signal bumps 586, 587 are provided at intersections of a grid. However, two other ground bumps, namely 581, 582, are not provided at intersections of the grid. Each differential signal bump is immediately adjacent at least two (namely, three) of the ground bumps. Particularly, the differential signal bump 586 is immediately adjacent three ground bumps 581-583. The ground bumps provide the pair of differential signal bumps with a shielding effect similar to that of a coaxial transmission line, in a manner similar to that described above with respect to FIGS. 2-4. A similar shielding effect is obtainable in an arrangement 580A, which is different from the arrangement 580 by omitting the ground bump 582. In some embodiments, the arrangement 580A is suitable for differential signal bumps that arranged along an edge of the bump pattern similarly to the edge bump 206s8 in FIG. 2.

In an arrangement 590, three ground bumps 591-593 are arranged around a pair of differential signal bumps 596, 597. The differential signal bumps 596, 597 are provided at intersections of a grid. However, all three ground bumps are not provided at intersections of the grid. Each differential signal bump is immediately adjacent at least two of the ground bumps. Particularly, the differential signal bump 596 is immediately adjacent two ground bumps 591 and 593. The ground bumps provide the pair of differential signal bumps with a shielding effect similar to that of a coaxial transmission line, in a manner similar to that described above with respect to FIGS. 2-4. A similar shielding effect is obtainable in an arrangement 590A, which is different from the arrangement 590 by an additional ground bump 585 between the ground bumps 592, 593.

In an arrangement 598, six ground bumps are arranged around a pair of differential signal bumps. Each differential signal bump is immediately adjacent at least two (namely, four) of the ground bumps. One or more of the ground bumps and signal bumps are not provided at intersections of a grid. The ground bumps provide the pair of differential signal bumps with a shielding effect similar to that of a coaxial transmission line, in a manner similar to that described above with respect to FIGS. 2-4.

In an arrangement 599, eight ground bumps are arranged around a pair of differential signal bumps. Each differential signal bump is immediately adjacent at least two (namely, five) of the ground bumps. One or more of the ground bumps and signal bumps are not provided at intersections of a grid. The ground bumps provide the pair of differential signal bumps with a shielding effect similar to that of a coaxial transmission line, in a manner similar to that described above with respect to FIGS. 2-4.

Figure 5B:
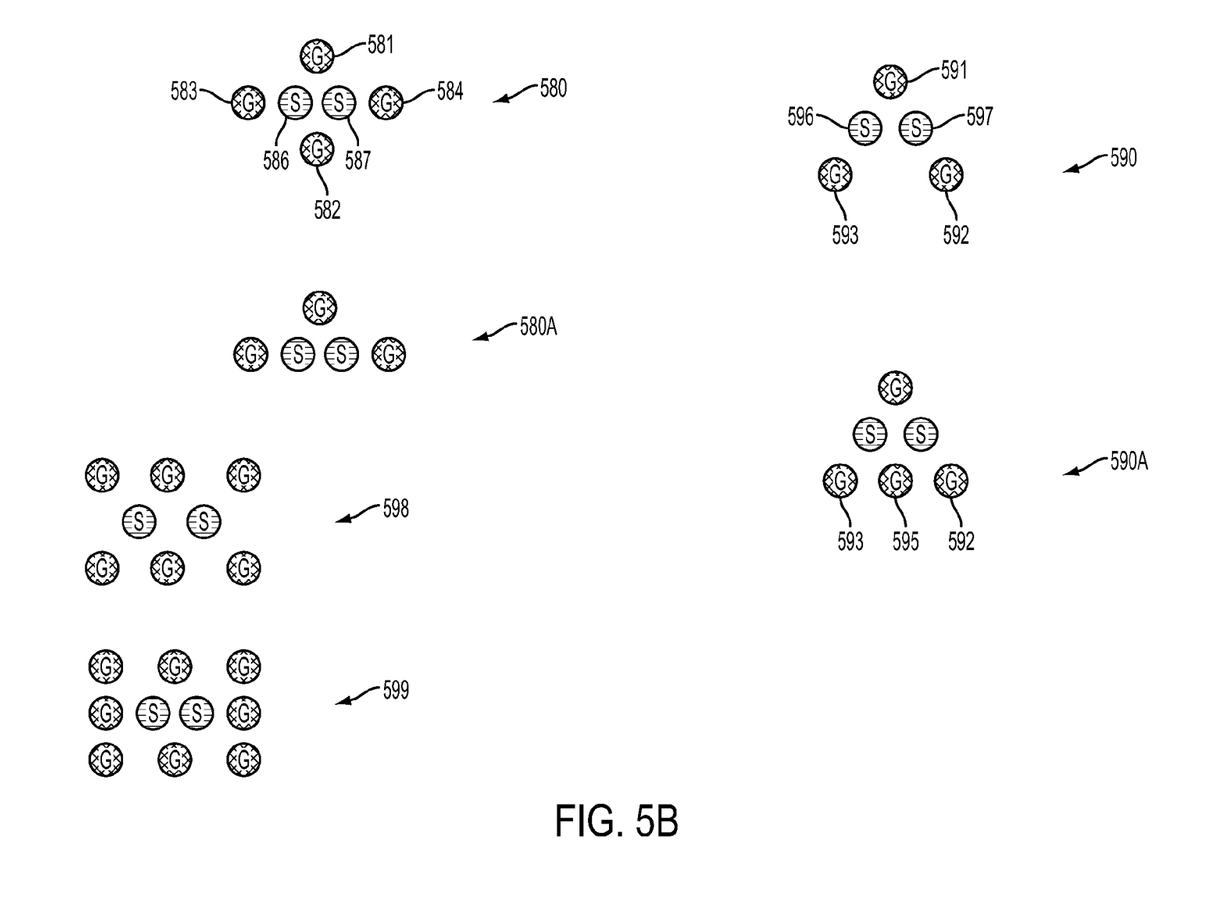

In some embodiments, the center-to-center distance or pitch between any of the differential signal bumps and each of the immediately adjacent ground bumps is 180 μm or less.

Figure 6:
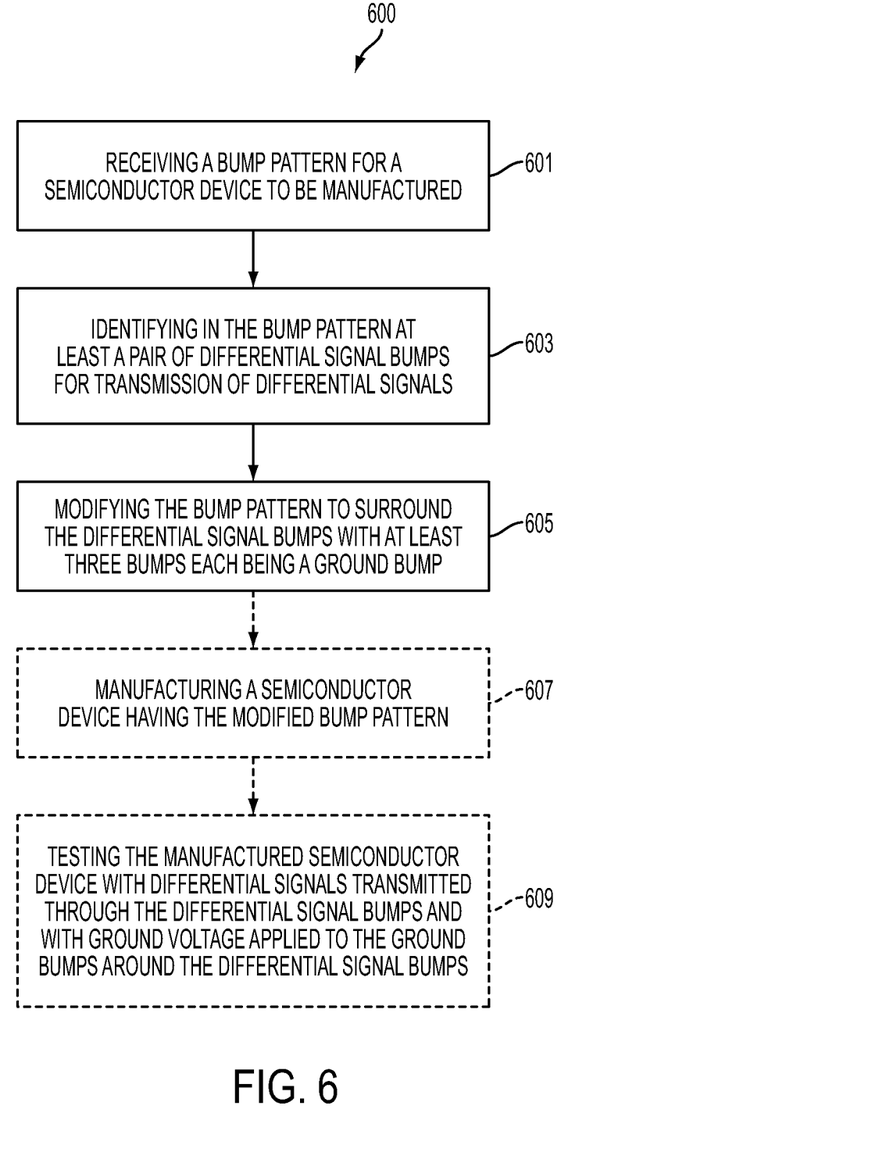
FIG. 6 is a flow chart of a method in accordance with some embodiments.

The arrangement of ground bumps around differential signal bumps as described above requires, in some embodiments, modifying a bump pattern initially provided for the semiconductor device. FIG. 6 is a flow chart of a method 600 in accordance with such embodiments.

At operation 601, a bump pattern of a plurality of bumps to be formed as electrical connections for a semiconductor device is received.

At operation 603, at least one pair of differential signal bumps is identified in the received bump pattern.

As operation 605, an arrangement of bumps in a neighboring bump region of each of the differential signal bumps is modified to ensure that at least three ground bumps are arranged around and immediately adjacent the differential signal bumps, so that each differential signal bump is immediately adjacent at least two of the ground bumps. In some embodiments, the resulting modified bump arrangement includes, but is not limited to, any of the arrangements described with respect to FIG. 5.

In some embodiments, the modification includes adding and/or moving one or more ground bumps as described with respect to FIG. 4. Alternatively or additionally, adding and/or moving a differential signal bump is/are implemented in one or more embodiments.

At operation 607, the semiconductor device is manufactured with the modified bump pattern. Any manufacturing process suitable for fabrication of semiconductor devices is applicable. An exemplary process will be described later with respect to FIG. 7.

At operation 609, the manufactured semiconductor device is probed, for example, with a wafer probing system 100 as described with respect to FIG. 1. Specifically, the probe pins 130 (FIG. 1) of the wafer probing system 100 are brought in contact with respective bumps of the semiconductor device. Differential test signals are transmitted through the probe pins in contact with the differential signal bumps, whereas the ground voltage is applied to the probe pins in contact with the neighboring, ground bumps around the differential signal bumps. As a result, the differential test signals transmitted through the probe pins in contact with the differential signal bumps are shielded from interference by the probe pins in contact with the neighboring, ground bumps to achieve a shielding effect similar to that of a coaxial transmission line, especially where the differential test signals are RF signals. Further advantages are also achievable as described with respect to FIG. 4.

In some embodiments, operation 607 or both operations 607 and 609 is/are omitted.

In some embodiments, the processes described with respect to operations 601, 603, 605 are realized by a processor, e.g., a central processing unit (CPU) of a computer system, which is programmed for performing such processes. However, in further embodiments, one or more of the processes is/are performed by specifically configured hardware (e.g., by one or more application specific integrated circuits or ASIC(s)) which is/are provided) separate from or in lieu of the processor. Some embodiments incorporate more than one of the described processes in a single ASIC. In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
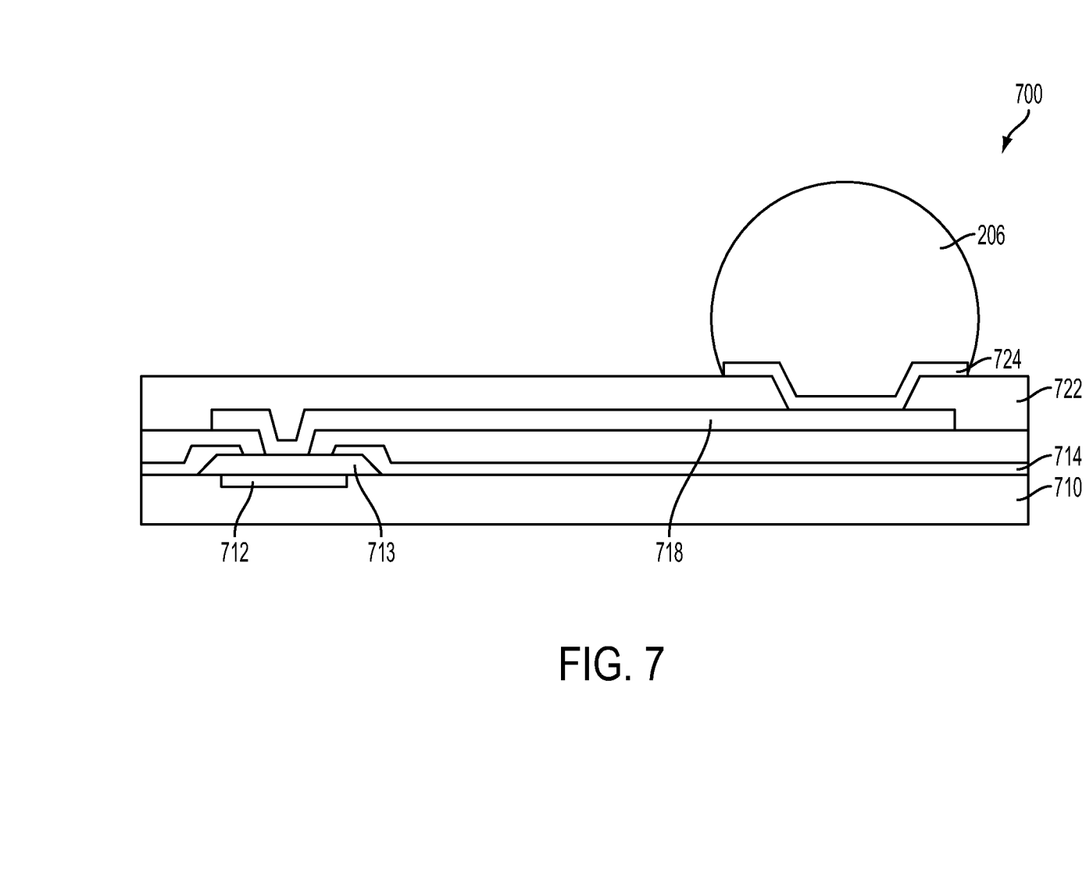
FIG. 7 is a cross-section view taken along line A-A' in FIG. 2.

FIG. 7 is a cross-section view taken along line A-A' in FIG. 2 showing a structure of a semiconductor device 700 in accordance with some embodiments. The semiconductor device 700 includes a substrate 710 which is a semiconductor substrate with integrated circuits formed therein and/or thereon. The substrate 710 further includes, in some embodiments, inter-layer dielectric layers and a metallization structure overlying the integrated circuits. A contact region 712 is a top metallization layer formed in a top-level inter-layer dielectric layer. A metal pad 713 is formed on the contact region 712. A passivation layer 714 is formed on the substrate 710 and patterned to form an opening exposing a portion of the metal pad 713. A post passivation interconnect (PPI) line 718 is formed to fill the opening and connect with the metal pad 713. The PPI line 718 also functions, in some embodiments, as power lines, re-distribution lines (RDL), inductors, capacitors or any passive components. A further passivation layer, e.g., a polymer layer, 722 is formed on the PPI line 718. Lithography technology and etching processes are then performed to pattern the polymer layer 722, thus an opening is formed to pass through the polymer layer 722 and expose a portion of the PPI line 718. An under-bump-metallurgy (UBM) layer 724 is formed on the polymer layer 722 and the exposed portion of the PPI line 718, and lines the sidewalls and bottom of the opening. A conductive material with solder wettability, such as SnAg, or other lead-free or lead-containing solder materials, is deposited on the exposed portion, thereby forming a bump 206 in contact with the underlying UBM layer 724. The bump 206 defines an electrical connection for the semiconductor device 700. The bump 206 is a ground bump or a signal bump. In some embodiments, the signal bump is an RF signal bump or a differential signal bump. In some embodiments, the bump 206 is a C4 bump.

In some embodiments, the semiconductor device 700 is probed before stacking on another semiconductor device or substrate or packaging.

The above method embodiment shows exemplary operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within scope of the disclosure and will be apparent to those skilled in the art after reviewing this disclosure.

According to some embodiments, in a method of improving bump allocation for a semiconductor device, a bump pattern of a plurality of bumps to be formed as electrical connections for the semiconductor device is received. In the bump pattern, at least one signal bump is identified. The bump pattern is modified to arrange at least three ground bumps around and immediately adjacent the signal bump. Each ground bump is configured to receive a ground voltage during operation or probing of the semiconductor device.

According to some embodiments, in a method of improving bump allocation for a semiconductor device, a bump pattern of a plurality of bumps to be formed as electrical connections for the semiconductor device is received. In the bump pattern, a pair of differential signal bumps for transmission of differential signals is identified. The bump pattern is modified to arrange at least three ground bumps around the differential signal bumps. Each ground bump is configured to receive a ground voltage during operation or probing of the semiconductor device. Each differential signal bump is immediately adjacent at least two of the ground bumps.

According to some embodiments, a semiconductor device with improved bump allocation includes a substrate, and a bump pattern of a plurality of bumps defining electrical connections for the semiconductor device. The bumps include one or more radio frequency (RF) signal bumps for transmission of RF signals during operation or probing of the semiconductor device. Each RF signal bump is surrounded by at least three neighboring bumps. Each of the at least three neighboring bumps is immediately adjacent the RF signal bump. Each of the at least three neighboring bumps is (i) a ground bump configured to receive a ground voltage during the operation or probing of the semiconductor device, or (ii) another RF signal bump which defines, together with the RF signal bump, a pair of differential signal bumps for transmission of differential RF signals during the operation or probing of the semiconductor device.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of improving bump allocation for a semiconductor device, said method comprising:
   receiving a bump pattern of a plurality of bumps to be formed as electrical connections for the semiconductor device;
   identifying in the bump pattern at least one signal bump; and
   modifying the bump pattern to arrange at least three ground bumps around and immediately adjacent the signal bump, each said ground bump configured to receive a ground voltage during operation or probing of the semiconductor device, wherein modifying the bump pattern comprises moving a preexisting ground bump of the received bump pattern to a position immediately adjacent the signal bump to define one of the at least three ground bumps.

2. The method of claim 1, further comprising
   manufacturing the semiconductor device having the modified bump pattern; and
   probing the manufactured semiconductor device by
      contacting probe pins of a wafer probing system with the signal bump and the at least three ground bumps around the signal bump,
      applying a test signal to the signal bump through the probe pin in contact with the signal bump, and
      applying the ground voltage to each of the at least three ground bumps around the signal bump, thereby shielding the test signal transmitted through the probe pin in contact with the signal bump from interference.

3. The method of claim 1, wherein the at least three ground bumps are equidistant from the signal bump.

4. The method of claim 1, wherein a distance between the signal bump and each of the at least three ground bumps is 180 μm or less.

5. The method of claim 4, wherein all the bumps in the bump pattern are Controlled Collapse Chip Connection (C4) bumps.

6. The method of claim 1, wherein said modifying includes adding a new ground bump to the received bump pattern at a position immediately adjacent the signal bump to define one of the at least three ground bumps around the signal bump.

7. The method of claim 1, wherein
said bump pattern comprises a number of columns and rows arranged to intersect at least one column with at least one row, all bumps of said bump pattern being arranged at intersections of said columns and rows; and
said modifying is performed such that, in the modified bump pattern, no other signal bump of the semiconductor device is arranged at an intersection immediately adjacent the intersection where the signal bump is located.

8. A method of improving bump allocation for a semiconductor device, said method comprising:
receiving a bump pattern of a plurality of bumps to be formed as electrical connections for the semiconductor device, wherein the received bump pattern includes an array of rows and columns, and the received bump pattern comprises at least one empty position at an intersection of the array of rows and columns;
identifying in the bump pattern a pair of differential signal bumps for transmission of differential signals; and
modifying the bump pattern to arrange at least three ground bumps around the differential signal bumps, each said ground bump configured to receive a ground voltage during operation or probing of the semiconductor device, each said differential signal bump immediately adjacent at least two of the ground bumps.

9. The method of claim 8, wherein the differential signal bumps are immediately adjacent each other.

10. The method of claim 8, further comprising
manufacturing the semiconductor device having the modified bump pattern; and
probing the manufactured semiconductor device by
contacting probe pins of a wafer probing system with the differential signal bumps and the at least three ground bumps around said differential signal bumps,
applying differential test signals to the differential signal bumps through the probe pins in contact with the differential signal bumps, and
applying the ground voltage to each of the at least three ground bumps around said differential signal bumps, thereby shielding the differential test signals transmitted through the probe pins in contact with the differential signal bumps from interference.

11. The method of claim 8, wherein each said differential signal bump is equidistant from the immediately adjacent ground bumps.

12. The method of claim 8, wherein a distance between each said ground bump and the differential signal bump immediately adjacent said ground bump is 180 μm or less.

13. The method of claim 12, wherein all the bumps in the bump pattern are Controlled Collapse Chip Connection (C4) bumps.

14. The method of claim 8, wherein said modifying includes
adding a new ground bump to the received bump pattern at a position immediately adjacent one of said differential signal bumps to define one of the at least three ground bumps around said differential signal bumps.

15. The method of claim 8, wherein said modifying includes
moving a preexisting ground bump of the received bump pattern to a position immediately adjacent one of said differential signal bumps to define one of the at least three ground bumps.

16. The method of claim 8, wherein
said bump pattern comprises a number of columns and rows crossing each other, all bumps of said bump pattern being arranged at intersections of said columns and rows; and
said modifying is performed such that, in the modified bump pattern, no other signal bump of the semiconductor device is arranged at an intersection immediately adjacent the intersection where either said differential signal bump is located.

17. A method of improving bump allocation for a semiconductor device, the method comprising:
identifying, in a bump pattern for the semiconductor device, at least one signal bump, wherein the bump pattern comprises an array of rows and columns; and
modifying the bump pattern so that at least three ground bumps are located immediately adjacent the at least one signal bump if the at least one signal bump is a non-differential signal bump, and so that at least two ground bumps and a second differential signal bump are located immediately adjacent to the at least one signal bump if the at least one signal bump is a differential signal bump, wherein modifying the bump pattern comprises positioning at least one empty location immediately adjacent the at least one signal bump.

18. The method of claim 17, wherein modifying the bump pattern comprises increasing a total number of bumps in the bump pattern.

19. The method of claim 17, wherein modifying the bump pattern comprises maintaining a total number of bump in the bump pattern.

20. The method of claim 8, wherein modifying the bump pattern comprises maintaining at least one empty position immediately adjacent one of said differential signal bumps.

* * * * *